(12) United States Patent
McKenzie et al.

(10) Patent No.: US 9,976,424 B2
(45) Date of Patent: May 22, 2018

(54) TURBINE BLADE

(71) Applicant: General Electric Company, Schenectady, NY (US)

(72) Inventors: Christopher Lloyd McKenzie, Peabody, MA (US); Robert Francis Manning, Newburyport, MA (US); Bhanu Mahasamudram Reddy, Boxford, MA (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 14/790,243

(22) Filed: Jul. 2, 2015

(65) Prior Publication Data
US 2017/0002664 A1 Jan. 5, 2017

(51) Int. Cl.
F01D 5/18 (2006.01)

(52) U.S. Cl.
CPC ............ *F01D 5/187* (2013.01); *F01D 5/188* (2013.01); *F05D 2220/323* (2013.01); *F05D 2240/307* (2013.01); *F05D 2250/185* (2013.01); *F05D 2260/202* (2013.01); *Y02T 50/676* (2013.01)

(58) Field of Classification Search
CPC .... F01D 5/187; F01D 5/188; F05D 2220/323; F05D 2240/307; F05D 2250/185; F05D 2260/202; Y02T 50/676
See application file for complete search history.

(56) References Cited

U.S. PATENT DOCUMENTS

| 4,753,575 | A | 6/1988 | Levengood et al. |
| 6,164,914 | A * | 12/2000 | Correia .................. F01D 5/186 415/115 |
| 6,974,308 | B2 | 12/2005 | Halfmann et al. |
| 7,097,419 | B2 * | 8/2006 | Lee .......................... F01D 5/081 415/115 |
| 7,641,444 | B1 * | 1/2010 | Liang ..................... F01D 5/187 416/1 |
| 8,192,146 | B2 * | 6/2012 | Liang ..................... F01D 5/186 415/115 |
| 8,616,845 | B1 | 12/2013 | Liang |
| 8,764,379 | B2 | 7/2014 | Pal |
| 8,777,567 | B2 | 7/2014 | Poon et al. |

(Continued)

FOREIGN PATENT DOCUMENTS

| CN | 102802866 A | 11/2012 |
| EP | 2 119 873 A2 | 11/2009 |
| WO | 2014113162 A2 | 7/2014 |

(Continued)

OTHER PUBLICATIONS

European Search Report and Opinion issued in connection with corresponding EP Application No. 6177403.9 dated Dec. 1, 2016.

(Continued)

*Primary Examiner* — Igor Kershteyn
*Assistant Examiner* — Brian P Wolcott
(74) *Attorney, Agent, or Firm* — General Electric Company; William Scott Andes (57) ABSTRACT

A turbine blade includes an airfoil having an internal cooling circuit. The cooling circuit includes a body cooling passage with at least one turn, and a tip cooling channel that forms a cooling barrier to thermally isolate the turn from at least a portion of the exterior surface of the airfoil.

17 Claims, 6 Drawing Sheets

(56) References Cited

U.S. PATENT DOCUMENTS 8,864,467 B1   10/2014   Liang

FOREIGN PATENT DOCUMENTS

| WO | 2016118135 A1 | 7/2016 | |
| WO | WO 2016118135 A1 * | 7/2016 | ............... F01D 5/08 |

OTHER PUBLICATIONS

First Office Action and Search issued in connection with corresponding CN Application No. 201610501005.1 dated May 3, 2017.
Notification of Reasons for Refusal issued in connection with corresponding JP Application No. 2016-131190 dated Jun. 20, 2017.
First Office Action and Search issued in connection with corresponding CN Application No. 201610501005.1 dated Jul. 18, 2017.

* cited by examiner

TURBINE BLADE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler fluid from the high and/or low pressure compressors to the engine components which require cooling. Temperatures in the high pressure turbine are around 1000° C. to 2000° C. and the cooling fluid from the compressor is around 500° C. to 700° C. While the compressor air is a high temperature, it is cooler relative to the turbine air, and may be used to cool the turbine.

Figure 7:
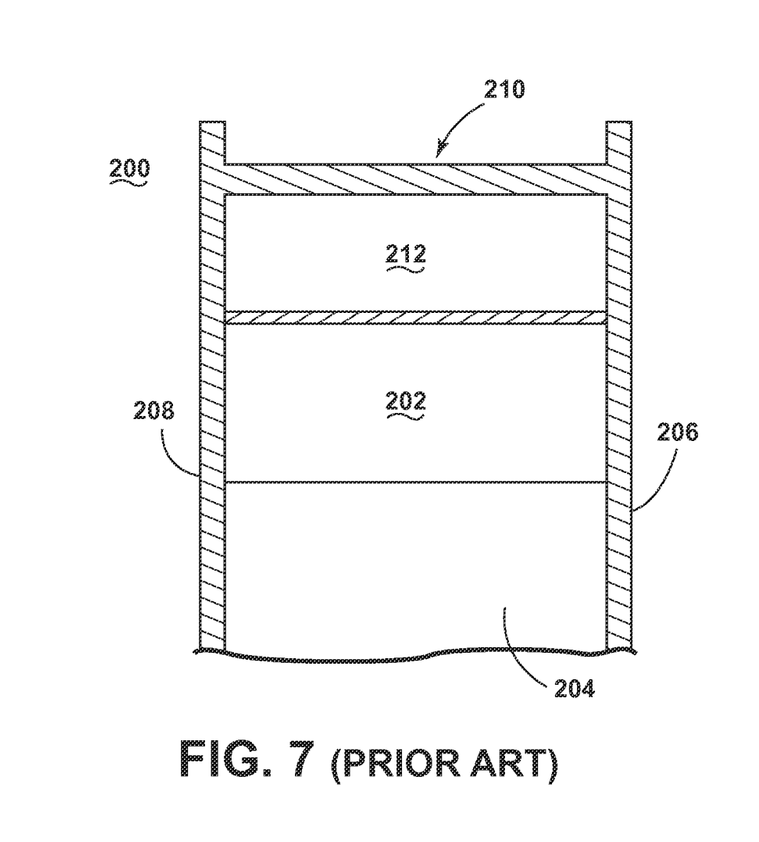
FIG. 7 is a sectional view showing a tip section for a prior art turbine blade.
Figure 8:
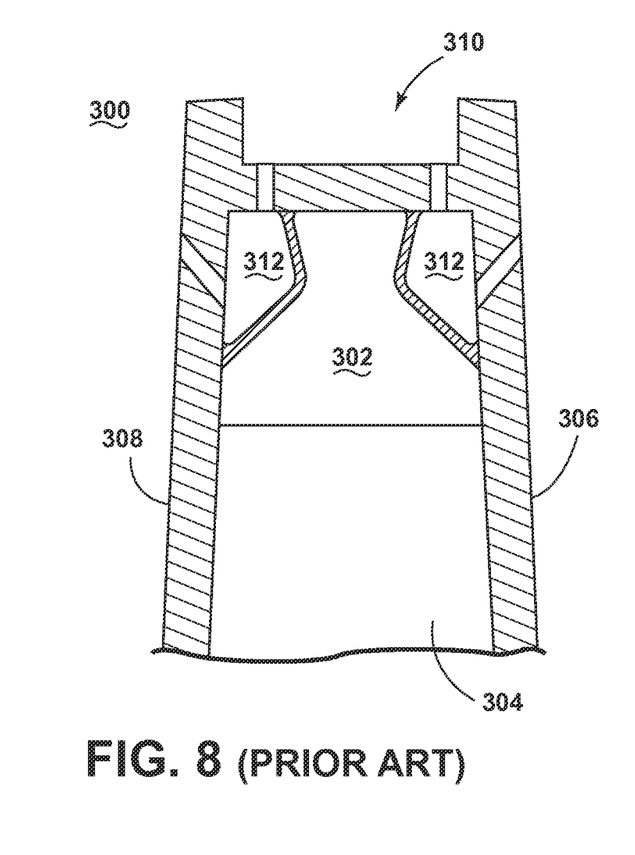
FIG. 8 is a sectional view showing a tip section for another prior art turbine blade.

Turbine blades generally include interior cooling channels for the cooling air, and may include portions passing through the airfoil main body and the tip of the blade. One prior art design for cooling a blade tip of is shown in FIG. 7. The airfoil 200 is cooled with a serpentine cooling channel having at least one turn 202 defined by an interior wall 204 extending between pressure and suction sidewalls 206, 208 of the airfoil 200. The tip 210 of the airfoil 200 is cooled with a tip channel 212. Another prior art design for cooling a blade tip is shown in FIG. 8. Like the other prior art design shown in FIG. 7, the airfoil 300 is cooled with a serpentine cooling channel having at least one turn 302 defined by an interior wall 304 extending between pressure and suction sidewalls 306, 308 of the airfoil 300. Here, the tip 310 of the airfoil 300 is cooled with peripheral tip channels 312 on the pressure and suction sidewalls 306, 308.

BRIEF DESCRIPTION OF THE INVENTION

The invention relates to a turbine blade. In one aspect, the invention relates to a turbine blade having an airfoil extending between a root and a tip, and having a pressure side and a suction side joined together to define a leading edge and a trailing edge, a body cooling passage located within the airfoil and having at least one tip turn located proximate the tip, and a tip cooling channel extending along the tip and enveloping the at least one tip turn to form a cooling barrier between the at least one tip turn and an exterior surface of the airfoil on all sides of the at least one tip turn.

In another aspect, the invention relates to a turbine blade having an airfoil extending between a root and a tip, and having a pressure side and a suction side joined together to define a leading edge and a trailing edge, a body cooling passage located within the airfoil and having at least one out leg extending from the root toward the tip, a return leg extending from the tip toward the root, and a tip turn connecting the out leg and the return leg and located proximate the tip, and a tip cooling channel extending along the tip and located between the tip turn and at least one of the sidewalls to form a cooling barrier between the at least one of the sidewalls and the tip turn for the full extent of the tip turn.

In yet another aspect, the invention relates to a turbine blade having an airfoil extending between a root and a tip, and having a pressure side and a suction side joined together to define a leading edge and a trailing edge, a body cooling passage located within the airfoil and having at least one out leg extending from the root toward the tip, a return leg extending from the tip toward the root, and a tip turn connecting the out leg and the return leg and located proximate the tip, with the tip turn having an outer side confronting the tip, and a tip cooling channel extending along the tip and extending between the turn outer side and the tip to form a cooling barrier there between.

DESCRIPTION OF EMBODIMENTS OF THE INVENTION

The described embodiments of the present invention are directed to a turbine blade, and particular to cooling a turbine blade. For purposes of illustration, the present invention will be described with respect to a turbine blade for an aircraft gas turbine engine. It will be understood, however, that the invention is not so limited and may have general applicability in non-aircraft applications, such as other mobile applications and non-mobile industrial, commercial, and residential applications.

Figure 1:
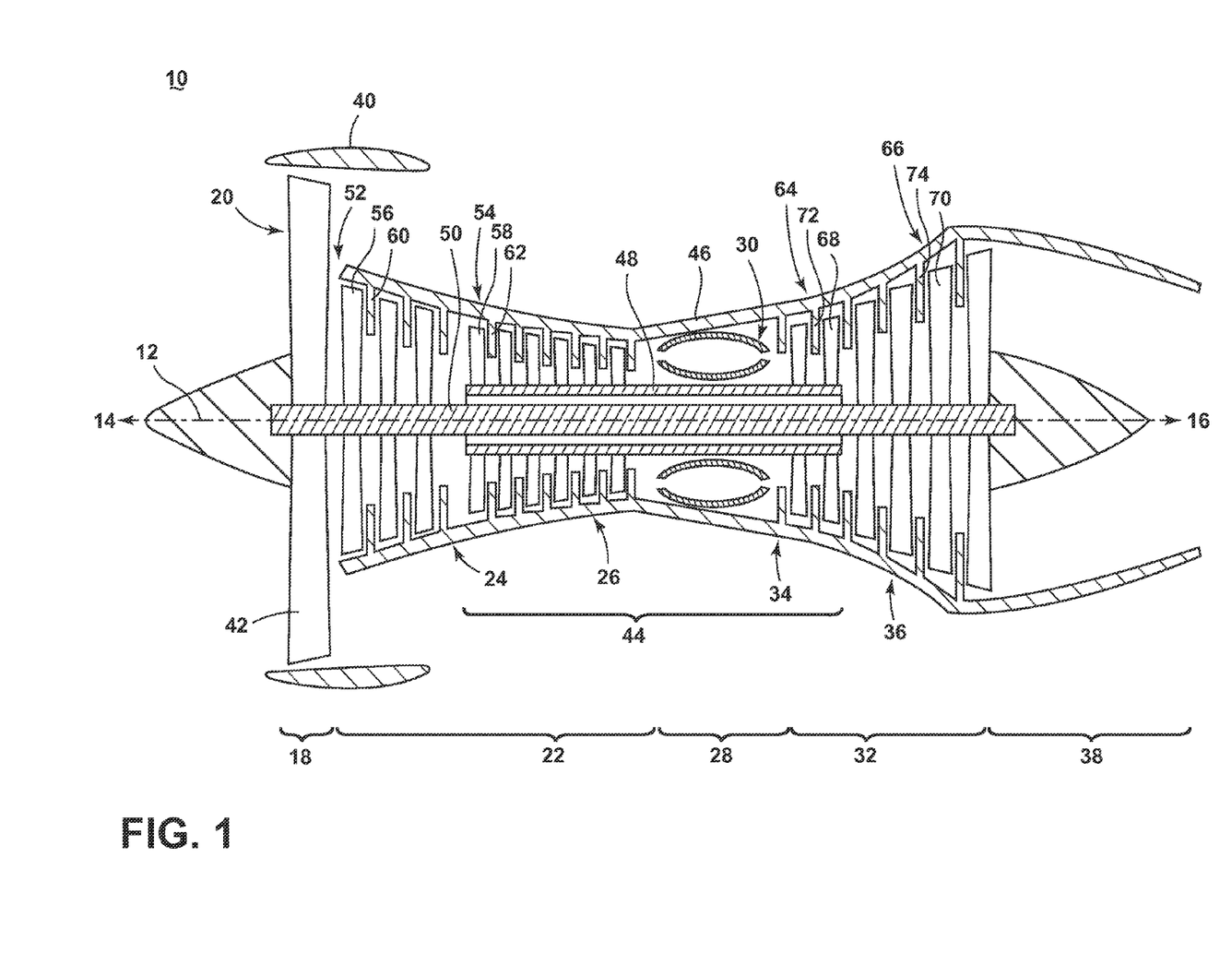
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
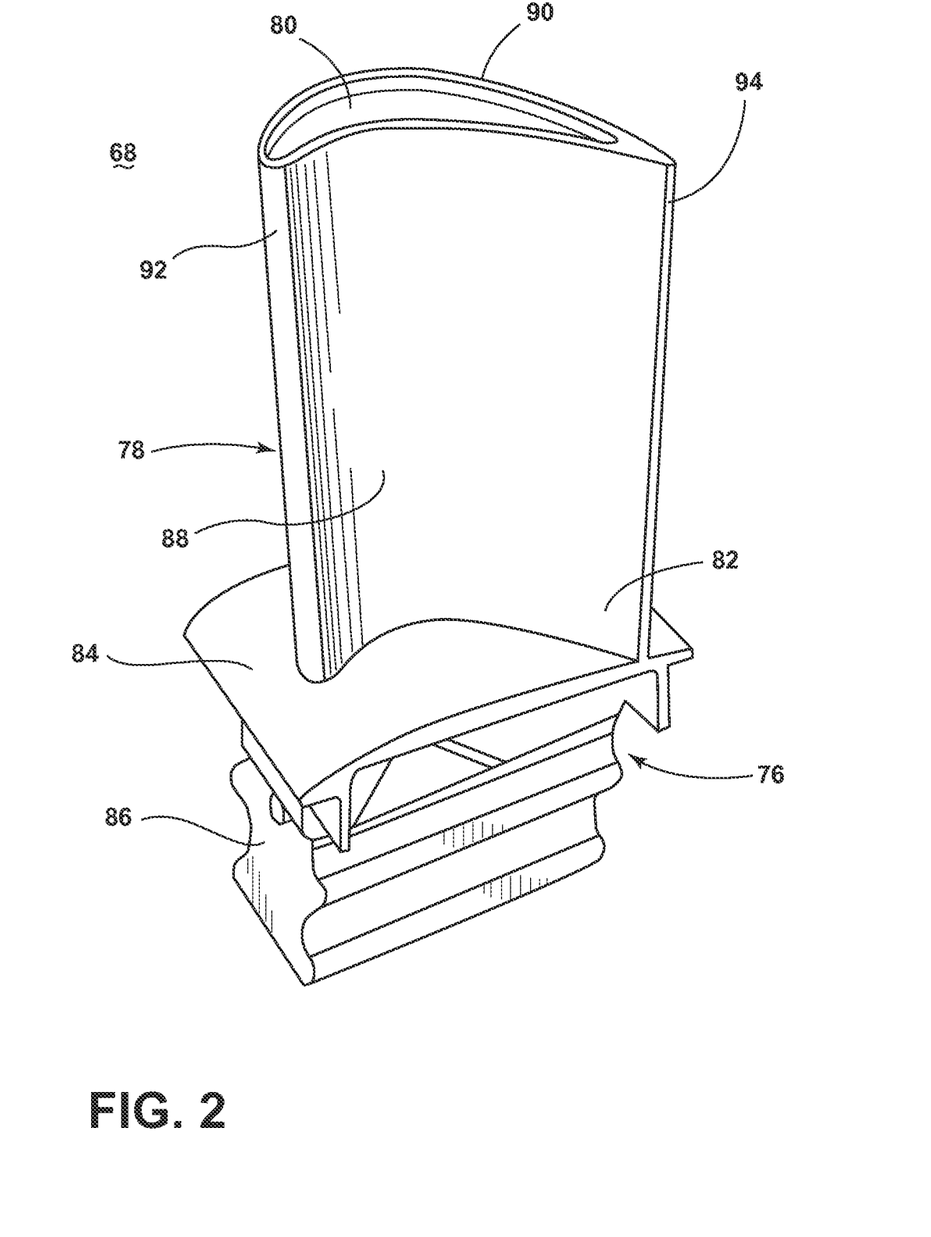
FIG. 2 is perspective view of an engine component in the form of a turbine blade of the engine from FIG. 1 according to a first embodiment of the invention.

FIG. 2 is a perspective view of an engine component in the form of one of the turbine blades 68 of the engine 10 from FIG. 1. The turbine blade 68 includes a root 76 and an airfoil 78. The airfoil 78 includes a tip 80 and a base 82. The root 76 further includes a platform 84 at the base 82 of the airfoil 78, which helps to radially contain the turbine air flow, and a dovetail 86. The airfoil 78 has a concave-shaped pressure sidewall 88 and a convex-shaped suction sidewall 90 which are joined together to define an airfoil shape with a leading edge 92 and a trailing edge 94. The blade 68 rotates in a direction such that the pressure sidewall 88 follows the suction sidewall 90. Thus, as shown in FIG. 2, the blade 68 would rotate into the page.

Figure 3:
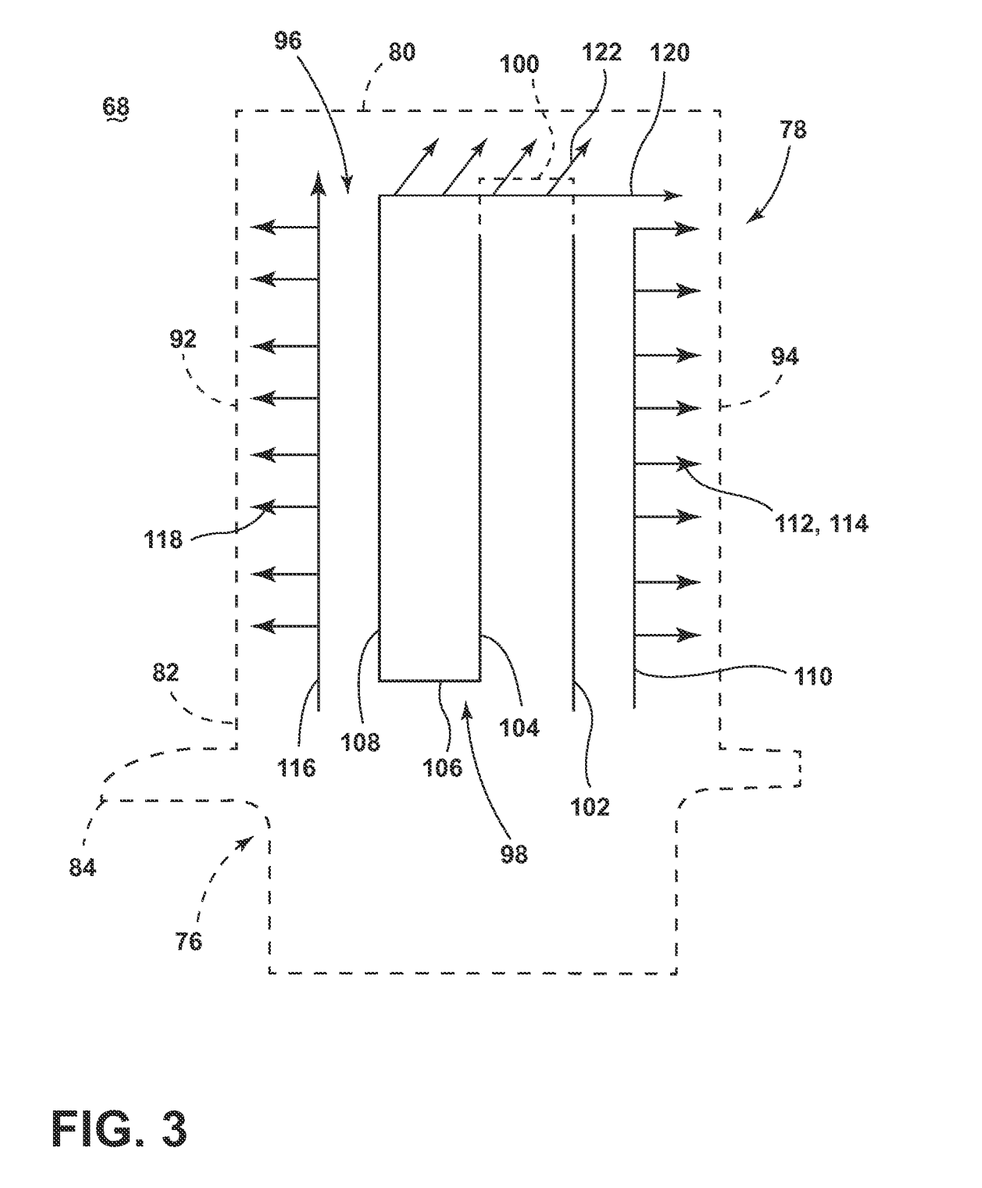
FIG. 3 is a flow diagram for a cooling circuit of the blade of FIG. 2.

FIG. 3 is a flow diagram for a cooling circuit 96 of the blade 68 of FIG. 2. The blade 68 is schematically shown in broken line to illustrate the general configuration of the cooling circuit 96 within the blade 68. The airfoil 78 defines an airfoil cavity extending from the leading edge 92 to the trailing edge 94 in a chordwise direction and from the tip 80 to the base 82 in a spanwise direction, and which may be divided into distinct channels or passages by internal walls to form the cooling circuit 96. The lines in the flow diagram represent the channels or passages of the cooling circuit 96 through the airfoil 78. The cooling circuit 96 directs a flow of cooling fluid through the airfoil 78.

The cooling circuit 96 includes a body cooling segment 98 with at least one turn 100 near the tip 80 of airfoil 78. The illustrated body cooling segment 98 includes a three pass serpentine body cooling passage. The serpentine cooling passage 98 feeds cooling flow forwardly, i.e. in a direction from the trailing edge 94 to the leading edge 92. The serpentine cooling passage 98 includes a first out leg 102 which extends from the root 76 to the tip turn 100, a second return leg 104 which extends from the tip turn 100 to a root turn 106 near the root 76, and a third out leg 108 which extends from the root turn 106 back toward the tip 80.

The cooling circuit 96 can further include a trailing edge cooling channel 110 that is fed by impingement from the first leg 102 in the serpentine cooling passage 98. The flow in the trailing edge channel 110 exits through one or more film holes 112, trailing edge slots 114, or trailing edge holes.

The cooling circuit 96 can further include a leading edge cooling channel 116 that is fed by impingement from the third leg 108 in the serpentine cooling passage 98. The flow in the leading edge channel 116 exits through one or more film holes 118 or trailing edge holes to the exterior surface of the airfoil 78. The flow in the third leg 108 may also exit through one or more trailing edge holes to the exterior surface of the airfoil 78.

The cooling circuit 96 further includes a tip cooling channel 120 that extends along the tip 80. The tip cooling channel 120, in addition to cooling the blade tip 80, forms a cooling barrier between the tip turn 100 and at least one of the exterior surfaces of the airfoil 78, such as the pressure and/or suction sidewalls 88, 90 (FIG. 2). The tip cooling channel 120 can be located between the tip turn 100 and at least one of the pressure and/or suction sidewalls 88, 90 for a portion of the tip turn 100 or the full extent of the tip turn 100 to thermally isolate the tip turn 100. In the illustrated diagram, the tip cooling channel 120 provides a cooling barrier for the full extent of the tip turn 100, i.e. for the portion of the cooling passage 98 joining the legs 102, 104.

The tip cooling channel 120 can be fed by the serpentine cooling passage 98, more specifically by the third leg 108 of the serpentine cooling passage 98 in the illustrated embodiment, which places the tip cooling channel 120 downstream of the tip turn 100. The flow in the tip cooling channel 120 extends in a direction from the leading edge to the trailing edge, and exits through one or more film holes 122, and may also feed into the trailing edge cooling channel 110.

The tip cooling channel 120 is a thermal dust shield for the tip turn 100, and insulates the tip turn 100 from the exterior surfaces of the airfoil 78, such as the pressure and/or suction sidewalls 88, 90 (FIG. 2). A portion of the tip cooling channel 120 can be molded or otherwise formed around the tip turn 100 as insulation against the high temperatures outside the airfoil 78, and thermally isolates the tip turn 100 from the effects of dust accumulation by mitigating the impact of tip turn dust accumulation.

During operation, the cooling circuit 96 receives cooling fluid from one or more inlet passages (not shown) provided in the root 76, and, after coursing through the various passages and channels 98, 110, 116, 120, the cooling fluid exits the airfoil 78 through the associated film holes and slots 112, 114, 118, 122. At the tip turn 100, dust carried by the cooling airflow may accumulate. The tip cooling channel 120 thermally isolates the tip turn 100, such that any dust that does accumulate at the tip turn 100 can be tolerated by the cooling circuit 96 without a significant impact the cooling effectiveness of the cooling circuit 96.

Figure 4:
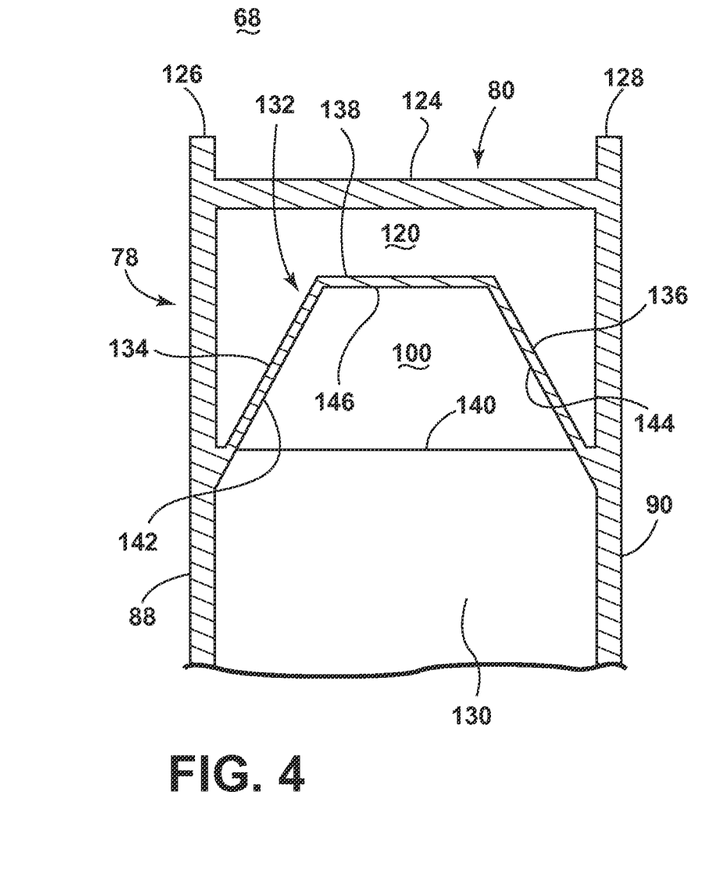
FIG. 4 is a sectional view of a tip section of the turbine blade of FIG. 2.

FIG. 4 is a sectional view of a tip section of the turbine blade 68 of FIG. 2. The blade tip 80 includes a tip cap 124 extending between the pressure and suction sidewalls 88, 90, and a pressure side tip rail 126 and a suction side tip rail 128 which extend from the tip cap 124. As shown, the tip turn 100 is proximate the blade tip 80 and is defined by an interior wall 130 extending between pressure and suction sidewalls 88, 90 of the airfoil 78. The airfoil 78 can be at least partially cooled by the tip turn 100 and the blade tip 80 is cooled by the tip cooling channel 120. The turn 100 is insulated from the exterior surfaces of the airfoil 78, including both the pressure and suction sidewalls 88, 90. In the orientation shown in FIG. 4, the cooling airflow moving around the tip turn 100 travels in a direction into the page.

In the illustrated embodiment, the tip turn 100 is nested within the tip cooling channel 120. The tip turn 100 and the tip cooling channel 120 are separated by a partition 132 extending between the pressure and suction sidewalls 88, 90, as well as along the chordwise direction. The tip cooling channel 120 extends between both the pressure and suction sidewalls 88, 90, and the tip cap 124, as well.

The illustrated partition 132 includes a pressure side end wall 134 and a suction side end wall 136 joined by a tip wall 138. The tip wall 138 is illustrated as being generally parallel to the tip cap 124, while the end walls 134, 136 are skewed relative to the tip cap 124 to define a general C-shaped cross-section for the tip cooling channel 120. In other embodiments, the partition 132 may be composed of additional or fewer walls, including an embodiment in which the partition 132 is composed of a single curved wall, such as a wall that curves upwardly from the sidewalls 88, 90 toward the tip cap 124.

To nest the entire tip turn 100, the pressure side end wall 134 and the suction side end wall 136, which join the pressure and suction sidewalls 88, 90 respectively, can extend at least to a free edge 140 of the interior wall 130 defining the tip turn 100. As the interior wall 130 directs the cooling airflow over the free edge 140, the cooling air flow at the turn 100 is thus thermally isolated from the pressure and suction sidewall 88, 90 by the portions of the tip cooling channel 120 lying between the sidewall 88, 90 and the end walls 134, 136.

The tip turn 100 has a pressure side 142, a suction side 144, and an outer side 146 generally defined along the walls 134, 136, 138, respectively, of the partition 132. The pressure side 142 generally confronts the pressure sidewall 88, the suction side 144 generally confronts the suction sidewall 90, and the outer side 146 generally confronts the tip 80. With the tip turn 100 nested or enveloped by the tip cooling channel 120, the tip cooling channel 120 forms a cooling barrier between the tip turn 100 and the exterior surfaces of the airfoil 78 on all sides 142, 144, 146 of the tip turn 100.

In the illustrated embodiment, the end walls 134, 136 extend slightly below the free edge 140 of the interior wall 130 defining the tip turn 100, with the bottommost portion of the tip cooling channel 120 substantially aligned with the free edge 140 such that the tip cooling channel 120 encompasses the entire tip turn 100. By locating the tip cooling channel 120 between the tip turn 100 and both of the pressure and suction sidewalls 88, 90 for the full extent of the tip turn 100, the entire open area above the interior wall 130 defining the tip turn 100 is thermally isolated from the exterior surfaces of the airfoil 78, including the pressure and suction sides 142, 144 of the tip turn 100. In other embodiments, a portion of the partition 132 may extend further along the interior wall 130, such that there is an overlap between the tip cooling channel 120 and the interior wall 130 to encompass the entire extent of the tip turn 100.

Figure 5:
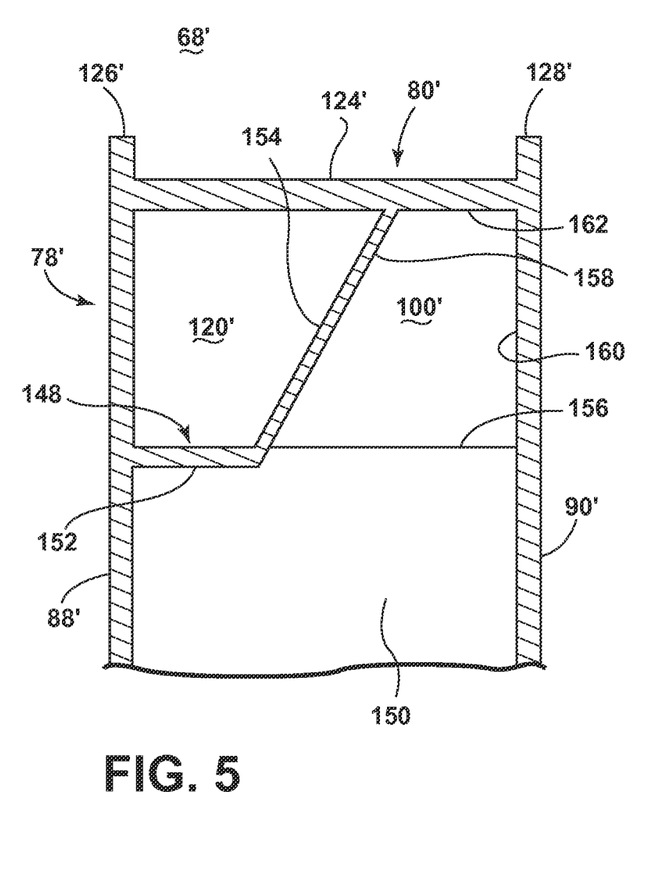
FIG. 5 is a sectional view showing an alternative tip section for the turbine blade according to a second embodiment of the invention.

FIG. 5 is a sectional view showing an alternative tip section for a turbine blade 68' according to a second embodiment of the invention. The turbine blade 68' of FIG. 5 may be substantially similar to the turbine blade 68 of FIGS. 2-4, and like elements are referred to with the same reference numerals bearing a prime (') symbol. For instance, the cooling circuit thorough the blade 68' may be identical or substantially similar to the cooling circuit 96 shown in FIG. 3.

In the second embodiment, the tip turn 100' may be insulated by the tip channel 120' along some, but not all, exterior surfaces of the airfoil 78', including either the pressure sidewall 88' or the suction sidewall 90'. This design may be efficient for smaller turbine blades having a thinner tip section. In one implementation, the tip turn 100' may be in a side-by-side relationship with the tip cooling channel 120' to insulate the tip turn 100' along one, but not both, of the pressure and suction sidewalls 88', 90'.

In the illustrated embodiment, tip channel 120' insulates the tip turn 100' along the pressure sidewall 88'. The tip turn 100' and the tip cooling channel 120' are separated by a partition 148 extending between the pressure sidewall 88' and the tip cap 124', as well as along the chordwise direction. The tip cooling channel 120' extends between the pressure sidewall 88' and the tip cap 124' as well. The tip turn 100' is proximate the blade tip 80' and is defined by an interior wall 150 extending between suction sidewall 90' and the partition 148. In the orientation shown in FIG. 5, the cooling airflow moving around the tip turn 100' travels in a direction into the page.

The illustrated partition 148 includes a pressure side end wall 152 joined to a tip wall 154. The pressure side end wall 152 is illustrated as being generally parallel to the tip cap 124', while the tip wall 154 is skewed relative to the tip cap 124' to define a general trapezoidal cross-section for the tip cooling channel 120'.

The pressure side end wall 152, which joins the pressure sidewall 88', can extend at least to a free edge 156 of the interior wall 150 defining the tip turn 100'. As the interior wall 150 directs the cooling airflow over the free edge 156, the cooling air flow at the turn 100' is thus thermally isolated from the pressure sidewall 88' by the portion of the tip cooling channel 120' lying between the sidewall 88' and the partition 148. Any dust that accumulates at the tip turn 100' can be tolerated by the cooling circuit 96 (FIG. 3) without a significant impact the cooling effectiveness of the cooling circuit 96.

The tip turn 100' has a pressure side 158, a suction side 160, and an outer side 162 generally defined along the tip wall 154, the suction sidewall 90, and the tip cap 124', respectively. The pressure side 158 generally confronts the pressure sidewall 88', the suction side 160 directly confronts the suction sidewall 90', and the outer side 146 directly confronts the tip 80'. With the tip turn 100' side-by-side with the tip cooling channel 120', the tip cooling channel 120' forms a cooling barrier between the tip turn 100' and the exterior surfaces of the airfoil 78' on the pressure side 158, but not the suction side 160 and outer side 162 of the tip turn 100'.

In the illustrated embodiment, the end wall 152 runs slightly below the free edge 156 of the interior wall 150 defining the tip turn 100', with the bottommost portion of the tip cooling channel 120' substantially aligned with the free edge 156 such that the tip cooling channel 120' is coextensive with the entire tip turn 100' along the pressure sidewall 88'. By locating the tip cooling channel 120' between the tip turn 100' the pressure sidewall 88' for the full extent of the tip turn 100', the entire pressure side 158 of the tip turn 100' is thermally isolated from the exterior surfaces of the airfoil 78'. In other embodiments, a portion of the partition 148 may extend further along the interior wall 150, such that there is an overlap between the tip cooling channel 120' and the interior wall 150 to encompass the entire extent of the pressure side 158 of the tip turn 100'.

It is noted that while the tip channel 120' illustrated for the second embodiment insulates the tip turn 100' along the pressure sidewall 88' for the full extent of the tip turn 100', other embodiments of the invention may insulate the tip turn 100' along the suction sidewall 90' for the full extent of the tip turn 100'. Further, either embodiment may further insulate the tip turn 100' along the tip cap 124' for the full extent of the tip turn 100'.

In any of the above embodiments, it is understood that while the body cooling segment 98 is shown as including a three pass serpentine body cooling passage having a single tip turn, other body cooling segments 98 having at least one tip turn may be included in the cooling circuit 96. In other embodiments the body cooling passage can include multiple turns, and the tip cooling channel can form a cooling barrier between the tip turns and at least a portion of the exterior of the airfoil 78. For example, a five pass serpentine body cooling passage having a two tip turns can be insulated by the tip cooling channel in the manner described above with respect to FIGS. 4-5. In another example, the cooling circuit 96 of the airfoil 78 can include multiple body cooling segments 98, each having at least one turn that is insulated by the tip cooling channel.

Figure 6:
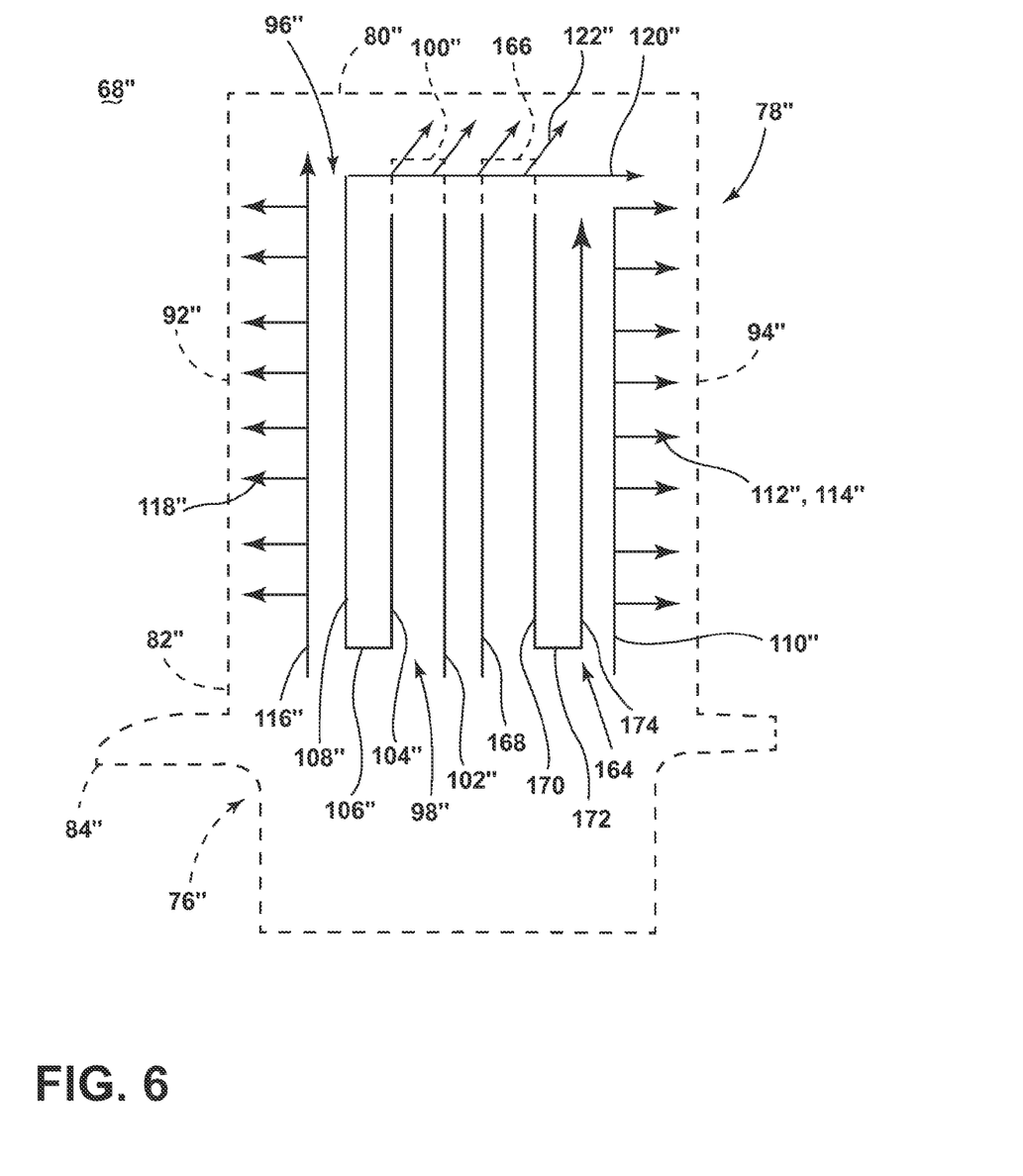
FIG. 6 is a flow diagram for a cooling circuit of a blade according to a third embodiment of the invention.

FIG. 6 is a flow diagram for a cooling circuit 96" of a blade 68" according to a third embodiment of the invention. The turbine blade 68" of FIG. 6 may be substantially similar to the turbine blades 68, 68' of FIGS. 2-5, and like elements are referred to with the same reference numerals bearing a double prime (") symbol. For instance, the cross-section through the tip 80" of the blade 68" may be identical or substantially similar to the sectional views shown in FIG. 4 or FIG. 5.

In the third embodiment, the cooling circuit 96" includes a body cooling segment 98" with an additional body cooling passage 164 having at least one turn 166 near the tip 80" of the airfoil 78". The illustrated additional body cooling passage 164 includes a three pass serpentine body cooling passage. The serpentine cooling passage 164 feeds cooling flow rearwardly, i.e. in a direction from the leading edge 92" to the trailing edge 94". The serpentine cooling passage 164 includes a first out leg 168 which extends from the root 76" to the tip turn 166, a second return leg 170 which extends from the tip turn 166 to a root turn 172 near the root 76", and a third out leg 174 which extends from the root turn 172 back toward the tip 80". Here, the trailing edge cooling channel 110" can be fed by impingement from the serpentine cooling passage 164. The flow in the serpentine cooling passage 164may also exit through one or more film holes and/or trailing edge holes to the exterior surface of the airfoil 78".

The tip cooling channel 120", in addition to cooling the blade tip 80", forms a cooling barrier between each tip turn 100", 166 and at least one of the exterior surfaces of the airfoil 78", such as the pressure and/or suction sidewalls 88", 90" (FIG. 2). The tip cooling channel 120" can be located between the tip turns 100", 166 and at least one of the pressure and/or suction sidewalls 88", 90" for a portion of the tip turn 100", 166 or the full extent of the tip turn 100", 166 to thermally isolate the tip turn 100", 166. In the illustrated diagram, the tip cooling channel 120" provides a cooling barrier for the full extent of the tip turns 100", 166, i.e. for the portions of the cooling passages 98", 164 joining the legs 102", 104" and legs 168, 170, respectively.

The tip cooling channel 120" is a thermal dust shield for the tip turns 100", 166, and insulates the tip turns 100", 166 from the exterior surfaces of the airfoil 78". A portion of the tip cooling channel 120" can be molded or otherwise formed around the tip turns 100", 166 as insulation against the high temperatures outside the airfoil 78", and thermally isolates the tip turns 100", 166 from the effects of dust accumulation by mitigating the impact of tip turn dust accumulation.

During operation, the cooling circuit 96" receives cooling fluid from one or more inlet passages (not shown) provided in the root 76", and, after coursing through the various passages and channels 98", 110", 116", 120", 164, the cooling fluid exits the airfoil 78" through the associated film holes and slots 112", 114", 118", 122". At the tip turns 100", 166, dust carried by the cooling airflow may accumulate. The tip cooling channel 120" thermally isolates the tip turns 100", 166, such that any dust that does accumulate at the tip turns 100", 166 can be tolerated by the cooling circuit 96" without a significant impact the cooling effectiveness of the cooling circuit 96".

The various embodiments of systems, methods, and other devices related to the invention disclosed herein provide improved cooling effectiveness and dust accumulation tolerance for the cooling circuit of a turbine blade. One advantage that may be realized in the practice of some embodiments of the described systems is that the tip cooling channel of the blade can be utilized to thermally isolate at least one tip turn of the cooling circuit for the full extent of the tip turn on at least one of pressure or suction sidewalls of the blade, and more preferably on both sidewalls, such that dust that accumulates at the tip turn can be tolerated without a reduction in cooling effectiveness of the cooling circuit. This provides engines operating in a dusty environment with a dust-tolerant blade. Dust is accumulated in a thermally isolated region of the airfoil, permitting increased dust accumulate tolerance, and therefore, providing increased operation before requiring overhaul. By improving resiliency to dust, cooled component life can be greatly improved.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine blade comprising:
an airfoil extending between a root and a tip, and having a pressure sidewall and a suction sidewall joined together to define a leading edge and a trailing edge;
a body cooling passage located within the airfoil and having at least one tip turn located proximate the tip; and
a tip cooling channel defined by a partition extending along the tip and enveloping the at least one tip turn to form a cooling barrier between the at least one tip turn and an exterior surface of the airfoil on all sides of the at least one tip turn;
wherein the at least one tip turn is defined by an interior wall having an edge;
wherein the partition comprises a first side wall having a first end and a second side wall having a second end, and the first end and the second end extend below the edge of the interior wall.

2. The turbine blade of claim 1, wherein the body cooling passage further comprises a serpentine cooling passage.

3. The turbine blade of claim 1, wherein the tip cooling channel is in fluid communication with the body cooling passage downstream of the at least one tip turn.

4. The turbine blade of claim 1, further comprising a plurality of tip turns located proximate the tip, wherein the tip cooling channel envelops the plurality of tip turns to form a cooling barrier between the plurality of tip turns and an exterior surface of the airfoil on all sides of the plurality of tip turns.

5. The turbine blade of claim 1, further comprising a plurality of body cooling passages located within the airfoil, wherein each of the plurality of body cooling passages has at least one tip turn located proximate the tip.

6. The turbine blade of claim 1, further comprising a trailing edge cooling channel having at least one film hole located along the trailing edge and fluidly coupled to the tip cooling channel.

7. The turbine blade of claim 1, wherein the partition further comprises a tip wall connected between the first side wall and the second side wall.

8. A turbine blade comprising:
an airfoil extending between a root and a tip, and having a pressure sidewall and a suction sidewall joined together to define a leading edge and a trailing edge;
a body cooling passage located within the airfoil and having at least one out leg extending from the root toward the tip, a return leg extending from the tip toward the root, and a tip turn connecting the at least one out leg and the return leg and located proximate the tip; and
a tip cooling channel defined by a partition extending along the tip and located between the tip turn and at least one of the sidewalls to form a cooling barrier between the at least one of the sidewalls and the tip turn for a full extent of the tip turn;
wherein the tip turn is defined by an interior wall having an edge;
wherein the partition comprises a side end wall extending below the edge of the interior wall and a tip end wall connected to the side end wall and the tip.

9. The turbine blade of claim 8, wherein the tip cooling channel is further located between the tip turn and both the pressure and suction sidewalls for the full extent of the tip turn.

10. The turbine blade of claim 9, wherein the body cooling passage further comprises a serpentine cooling passage.

11. The turbine blade of claim 8, further comprising multiple tip turns located proximate the tip, wherein the tip cooling channel is located between the multiple tip turns and at least one of the sidewalls to form a cooling barrier between the at least one of the sidewalls and the multiple tip turns for the full extent of the multiple tip turns.

12. The turbine blade of claim 8, further comprising multiple body cooling passages located within the airfoil, wherein each of the body cooling passages has a tip turn located proximate the tip.

13. The turbine blade of claim 8, further comprising a trailing edge cooling channel having at least one film hole located along the trailing edge and fluidly coupled to the tip cooling channel.

14. The turbine blade of claim 8, wherein the body cooling passage further comprises a serpentine cooling passage.

15. The turbine blade of claim 14, wherein the at least one out leg comprises a first out leg connected to the return leg by the tip turn, and a second out leg extending from the root toward the tip, and the serpentine cooling passage further comprises a root turn connecting the return leg and the second out leg and located proximate the root.

16. The turbine blade of claim 8, wherein the tip cooling channel is in fluid communication with the body cooling passage downstream of the tip turn.

17. The turbine blade of claim 8, wherein the side end wall is connected to the pressure sidewall or the suction sidewall.

* * * * *